US00RE50967E

(19) United States
(12) Reissued Patent
Balinski et al.

(10) Patent Number: US RE50,967 E
(45) Date of Reissued Patent: *Jul. 28, 2026

(54) DISH RACK AND WASH ASSEMBLY FOR DISHWASHER

(71) Applicant: Whirlpool Corporation, Benton Harbor, MI (US)

(72) Inventors: Steven B. Balinski, Saint Joseph, MI (US); David Brightbill, Benton Harbor, MI (US); Frederick Thomas Roderick, Coloma, MI (US); Joseph T. Ferencevich, Saint Joseph, MI (US); Ryan Kevin Roth, Saint Joseph, MI (US); William J. Snell, Elkhart, IN (US); Sujit S. Naik, Pune (IN); Mark S. Feddema, Kalamazoo, MI (US)

(73) Assignee: Whirlpool Corporation, Benton Harbor, MI (US)

( * ) Notice: This patent is subject to a terminal disclaimer.

(21) Appl. No.: 18/784,895

(22) Filed: Jul. 25, 2024

Related U.S. Patent Documents

Reissue of:
(64) Patent No.: 11,395,574
Issued: Jul. 26, 2022
Appl. No.: 16/903,599
Filed: Jun. 17, 2020

U.S. Applications:
(63) Continuation of application No. 15/927,377, filed on Mar. 21, 2018, now Pat. No. 10,716,449.

(51) Int. Cl.
*A47L 15/00* (2006.01)
*A47L 15/22* (2006.01)
(Continued)

(52) U.S. Cl.
CPC ..... *A47L 15/0065* (2013.01); *A47L 15/22* (2013.01); *A47L 15/4214* (2013.01); *A47L 15/4246* (2013.01); *A47L 15/50* (2013.01)

(58) Field of Classification Search
CPC .. A47L 15/0065; A47L 15/22; A47L 15/4214; A47L 15/4246; A47L 15/50
See application file for complete search history.

(56) References Cited

U.S. PATENT DOCUMENTS 2,910,207 A 10/1959 Andrew
2,987,260 A * 6/1961 Sasnett ..... A47L 15/23 239/245
(Continued)

FOREIGN PATENT DOCUMENTS

CN 1579313 A * 2/2005 ..... A47L 15/4285
CN 101049224 A 10/2007
(Continued)

OTHER PUBLICATIONS

Machine translation of WO 2018/082321 (Year: 2018).*
(Continued)

*Primary Examiner* — William E Dondero
(74) *Attorney, Agent, or Firm* — Price Heneveld LLP

(57) ABSTRACT

A dishwasher for treating dishes according to an automatic cycle of operation can include a tub at least partially defining a treating chamber receiving dishes for treatment and a spray system providing treating liquid to the treating chamber. A dish rack is located in the tub and has a bottom wall and at least a side wall extending upwardly from the bottom wall. A depending portion extends downwardly from the bottom wall and is oriented at an angle to the bottom wall to define an incline angle. At least one spray tube is carried by the dish rack.

50 Claims, 7 Drawing Sheets

(51) Int. Cl.
*A47L 15/42* (2006.01)
*A47L 15/50* (2006.01)

(56) References Cited

U.S. PATENT DOCUMENTS

| | | | | |
|---|---|---|---|---|
| 3,040,901 | A | 6/1962 | Andrew | |
| D196,450 | S | 10/1963 | Claywell | |
| 3,269,548 | A | 8/1966 | Geiger et al. | |
| 3,361,361 | A | 1/1968 | Schutte | |
| D212,121 | S | 8/1968 | Tuthill | |
| 3,752,322 | A | 8/1973 | Fiocca et al. | |
| D376,451 | S | 12/1996 | Osborn | |
| 5,626,242 | A * | 5/1997 | Weizer | A47L 15/50 211/151 |
| D383,505 | S | 9/1997 | Wise et al. | |
| D383,879 | S | 9/1997 | Good | |
| 5,673,714 | A | 10/1997 | Campagnolo et al. | |
| D393,505 | S | 4/1998 | Good | |
| D398,092 | S | 9/1998 | Good | |
| 6,869,029 | B2 | 3/2005 | Ochoa, Sr. et al. | |
| 7,032,604 | B2 | 4/2006 | Welch | |
| 7,594,513 | B2 | 9/2009 | Vanderroest et al. | |
| 7,621,286 | B2 | 11/2009 | Frei et al. | |
| 7,896,977 | B2 | 3/2011 | Gillum et al. | |
| 8,007,598 | B2 | 8/2011 | Chen et al. | |
| 8,408,403 | B2 | 4/2013 | Hedstrom et al. | |
| 8,646,620 | B2 | 2/2014 | Klump et al. | |
| 8,778,094 | B2 | 7/2014 | Blanchard et al. | |
| 8,801,863 | B2 | 8/2014 | Blanchard et al. | |
| 8,813,766 | B2 | 8/2014 | Bhajak et al. | |
| 8,820,544 | B2 | 9/2014 | Lindgren et al. | |
| 8,915,560 | B2 | 12/2014 | Cox et al. | |
| 9,113,773 | B2 | 8/2015 | Bartloff et al. | |
| D739,094 | S | 9/2015 | Ovesen | |
| 9,241,607 | B2 | 1/2016 | Porcaro, II et al. | |
| D750,854 | S | 3/2016 | Lee et al. | |
| D750,855 | S | 3/2016 | Lee et al. | |
| 9,295,369 | B2 | 3/2016 | Fauth et al. | |
| 9,326,657 | B2 | 5/2016 | Thiyagarajan | |
| 9,420,938 | B2 | 8/2016 | Forst et al. | |
| 9,445,703 | B2 | 9/2016 | Hiedel et al. | |
| 9,532,701 | B2 | 1/2017 | Feddema et al. | |
| 9,579,009 | B2 | 2/2017 | Bhajak et al. | |
| 9,596,731 | B1 | 3/2017 | Lin | |
| 9,596,975 | B2 | 3/2017 | Bhajak et al. | |
| 9,609,999 | B2 | 4/2017 | Delle | |
| 9,629,516 | B2 | 4/2017 | Chen et al. | |
| 9,914,155 | B2 | 3/2018 | Disch et al. | |
| 10,045,681 | B2 | 8/2018 | Schessl et al. | |
| D827,953 | S | 9/2018 | Lee et al. | |
| 10,716,449 | B2 | 7/2020 | Balinski et al. | |
| D900,417 | S | 10/2020 | Baldwin et al. | |
| 10,888,212 | B2 | 1/2021 | Feddema et al. | |
| 10,952,589 | B2 | 3/2021 | Brightbill et al. | |
| 11,006,813 | B2 | 5/2021 | Naik et al. | |
| D927,101 | S | 8/2021 | Baldwin et al. | |
| 11,179,019 | B2 | 11/2021 | Sayir | |
| 11,219,350 | B2 | 1/2022 | Fawaz et al. | |
| D950,877 | S | 5/2022 | Tuang | |
| 11,337,583 | B2 | 5/2022 | Feddema et al. | |
| D956,372 | S | 6/2022 | Pugh et al. | |
| D957,779 | S | 7/2022 | Zang | |
| 11,375,874 | B2 | 7/2022 | Feddema et al. | |
| D960,466 | S | 8/2022 | Viswanathan et al. | |
| 11,484,180 | B2 | 11/2022 | Dietrich et al. | |
| D973,290 | S | 12/2022 | Naik et al. | |
| D977,768 | S | 2/2023 | Ding et al. | |
| 2003/0226580 | A1 | 12/2003 | Welch | |
| 2005/0241680 | A1* | 11/2005 | Noh | A47L 15/4219 134/198 |
| 2006/0237051 | A1 | 10/2006 | Bengston et al. | |
| 2007/0158472 | A1 | 7/2007 | Calhoun et al. | |
| 2008/0169009 | A1 | 7/2008 | Mailander | |
| 2009/0159103 | A1 | 6/2009 | Gillum et al. | |
| 2009/0255560 | A1 | 10/2009 | Lehmann et al. | |
| 2010/0101611 | A1 | 4/2010 | Chen et al. | |
| 2011/0139181 | A1 | 6/2011 | Lee et al. | |
| 2012/0138106 | A1 | 6/2012 | Fountain et al. | |
| 2013/0255733 | A1 | 10/2013 | Ju et al. | |
| 2015/0129004 | A1 | 5/2015 | Lee et al. | |
| 2015/0190033 | A1* | 7/2015 | Shaffer | A47L 15/507 312/228.1 |
| 2015/0201823 | A1 | 7/2015 | Poojary et al. | |
| 2015/0245762 | A1 | 9/2015 | Tuller | |
| 2017/0135547 | A1 | 5/2017 | Tuller | |
| 2018/0220867 | A1* | 8/2018 | Carr | A47L 15/50 |
| 2018/0242816 | A1* | 8/2018 | Cao | A47L 15/50 |
| 2021/0298561 | A1 | 9/2021 | Feddema et al. | |
| 2023/0066054 | A1 | 3/2023 | Feddema | |

FOREIGN PATENT DOCUMENTS

| | | | | |
|---|---|---|---|---|
| CN | 104905745 | A | 9/2015 | |
| CN | 105431070 | A | 3/2016 | |
| CN | 106073675 | A | 11/2016 | |
| CN | 106923767 | A | 7/2017 | |
| CN | 106998989 | A | 8/2017 | |
| CN | 107320043 | A | 11/2017 | |
| CN | 106343937 | B | 12/2019 | |
| CN | 30487500 | S | 10/2020 | |
| CN | 307125899 | S | 2/2022 | |
| DE | 6810173 | U | 8/1969 | |
| DE | 2907916 | A1 | 9/1980 | |
| DE | 9317963 | U1 * | 5/1995 | A47I 15/50 |
| DE | 102009033895 | A1 | 4/2010 | |
| DE | 102014223373 | B3 * | 11/2015 | A47L 15/503 |
| EP | 1334687 | A1 | 8/2003 | |
| EP | 2192852 | A1 | 6/2010 | |
| EP | 2594186 | B1 | 1/2014 | |
| EP | 2912983 | A2 | 9/2015 | |
| EP | 3222191 | A1 | 9/2017 | |
| GB | 1123787 | A | 8/1968 | |
| GB | 2058852 | A | 4/1981 | |
| KR | 20050068480 | A | 7/2005 | |
| KR | 101217384 | B1 * | 12/2012 | A47L 15/42 |
| KR | 301079101 | S | 10/2020 | |
| KR | 301079752 | S | 10/2020 | |
| KR | 301079754 | S | 10/2020 | |
| KR | 301130470 | S | 10/2021 | |
| WO | 2009041899 | A1 | 4/2009 | |
| WO | 2016206712 | A1 | 12/2016 | |
| WO | WO 2018/082321 | * | 5/2018 | A47L 15/502 |

OTHER PUBLICATIONS

Dons Appliances, An Overview of KitchenAid Dishwasher KDTM404KPS, announced in YouTube on Jan. 19, 2021 [online], [site visited Apr. 5, 2022], Available from the internet URL: An Overview of KitchenAid Dishwasher (KDTM404KPS) | KitchenAid Dishwasher Review (2021) (Year: 2021).

Appliance Factory Parts, Part GEHWD28X10210, available in https://www.appliancefactoryparts.com customer review oldest date Dec. 27, 2014 [online], [site visited Apr. 5, 2022], Available from the internet URL: https://www.appliancefactoryparts.com/search/part/1109159/ (Year: 2014).

Bosch Customer Brochure, 2019, Bosch 800 Series Dishwasher (SHPM88Z75N).

Bosch Press Release, "Bosch Takes Silence to the Next Level with Innovative Dishwasher Line," May 15, 2013, Toronto, ON, Available from the Internet URL: https://www.bosch-home.ca/en/press/pressrelease-320 [site visited Dec. 15, 2025].

Jeff Clemens, Grand Blog, "New Bosch Dishwashers Have Arrived At Grand," May 31, 2013, Available from the Internet URL: https://grandapplianceandtv.wordpress.com/2013/05/31/new-bosch-dishwashers-have-arrived-at-grand/ [site visited Dec. 15, 2025].

Ed Perratore, Consumer Reports News, "Four new Bosch dishwashers added to our list of top picks," Jul. 18, 2013, Available from the Internet URL: https://www.consumerreports.org/cro/news/2013/07/four-new-bosch-dishwashers-added-to-our-list-of-top-picks/index.html [site visited Dec. 15, 2025].

(56) References Cited

OTHER PUBLICATIONS

Bosch Home Appliances, GlobeNewswire by notified, "Bosch Home Appliances Revolutionizes Dishwasher Category with New Advanced Drying Technologies," "New Dishwasher Line Answers Demand for Superior Drying and Cleaning Performance," Feb. 19, 2019, Available from the Internet URL: https://www.globenewswire.com/news-release/2019/02/19/1734216/0/en/Bosch-Home-Appliances-Revolutionizes-Dishwasher-Category-with-New-Advanced-Drying-Technologies.html [site visited Dec. 15, 2025].

ABT Electronics, YouTube Video, "Bosch 800 Series Dishwasher SHPM88Z75N," Apr. 5, 2022, Available from the Internet URL: https://www.youtube.com/watch?v=v8lwDWJc-CQ [site visited Dec. 15, 2025].

Dr. Kimberly K. Cameron, "Expert Declaration of Dr. Kimberly K. Cameron Regarding Non-Infringement and Invalidity of the Asserted Patents" and related exhibits, U.S. District Court for the Eastern District of Texas Marshall Division, Civil Action No. 2:25-cv-01042-JRG-RSP, Dated Dec. 12, 2025.

*Samsung Electronics Co, Ltd., Samsung Electronics America, Inc.* V. *Whirlpool Corporation*, Petition for Inter Partes Review of U.S. Pat. No. 10,512,385, Case No. IPR2026-00337, Submitted by Benjamin Haber (Reg. No. 67, 129), Dated Apr. 15, 2026.

*Samsung Electronics Co, Ltd., Samsung Electronics America, Inc.* V. *Whirlpool Corporation*, Petition for Post Grant Review of U.S. Pat. No. 12,543,922, Case No. PGR2026-00043, Submitted by Benjamin Haber (Reg. No. 67, 129), Dated Apr. 14, 2026.

*Samsung Electronics Co, Ltd., Samsung Electronics America, Inc.* V. *Whirlpool Corporation*, Petition for Inter Partes Review of U.S. Pat. No. 12,232,681, Case No. IPR2026-00336, Submitted by Benjamin Haber (Reg. No. 67, 129), Dated Apr. 13, 2026.

Dr. Kimberly K. Cameron, "Declaration of Dr. Kimberly K. Cameron in Support of Petition for Inter Partes Review of U.S. Pat. No. 10,512,385" and related exhibits, United States Patent and Trademark Office Before The Patent Trial and Appeal Board, Case No. IPR2026-00337, Dated Apr. 15, 2026.

Dr. Kimberly K. Cameron, "Declaration of Dr. Kimberly K. Cameron in Support of Petition for Post Grant Review of U.S. Pat. No. 12,543,922" and related exhibits, United States Patent and Trademark Office Before The Patent Trial and Appeal Board, Case No. PGR2026-00043, Dated Apr. 14, 2026.

Dr. Kimberly K. Cameron, "Declaration of Dr. Kimberly K. Cameron in Support of Petition for Inter Partes Review of U.S. Pat. No. 12,232,681" and related exhibits, United States Patent and Trademark Office Before The Patent Trial and Appeal Board, Case No. IPR2026-00336, Dated Apr. 13, 2026.

Chinese Patent Office, Office Action re Corresponding Application No. 201910214399.6, dated Apr. 27, 2021, 9 pages, China.

European Patent Office, European Search Report re Application No. 19162568.0-1018 / 3545811, dated Sep. 4, 2019, 10 pages, Munich, Germany.

* cited by examiner

DISH RACK AND WASH ASSEMBLY FOR DISHWASHER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This application is a continuation application of U.S. patent application Ser. No. 15/927,377, filed Mar. 21, 2018, now U.S. Pat. No. 10,716,449, which is incorporated herein by reference in its entirety.

BACKGROUND

Household dishwashers typically include one or more dish racks for holding various types of dishes in the dishwasher tub. Traditionally, a dishwasher includes an upper rack that holds glassware and small dishes, and a lower rack that holds larger dishes, such as plates. These two dish racks usually consume most of the space inside the dishwasher tub. Some dishwashers can also include a third dish rack, often for silverware or other low profile utensils.

SUMMARY

In one aspect, the present disclosure relates to a dishwasher for treating dishes according to an automatic cycle of operation, the dishwasher including a tub at least partially defining a treating chamber receiving dishes for treatment, a spray system providing treating liquid to the treating chamber, a dish rack located in the tub and having a bottom wall and at least a side wall extending upwardly from the bottom wall, with a depending portion extending downwardly from the bottom wall to define a vertical height of the depending portion, the depending portion oriented at an angle to the bottom wall to define an incline angle, and at least one spray tube carried by the dish rack and located within the vertical height of the depending portion below the bottom wall, the at least one spray tube having nozzles emitting spray into the depending portion, wherein the dish rack has a low profile with the height of the side wall being less than the vertical height of the depending portion.

In another aspect, the present disclosure relates to a dishwasher for treating dishes according to an automatic cycle of operation, the dishwasher including a tub at least partially defining a treating chamber receiving dishes for treatment, a spray system providing treating liquid to the treating chamber, a dish rack located in the tub and having a bottom wall and at least a side wall extending upwardly from the bottom wall, with a depending portion extending downwardly from the bottom wall to define a vertical height of the depending portion, the depending portion oriented at an angle to the bottom wall to define an incline angle, and at least one spray tube carried by the dish rack and located within the vertical height of the depending portion below the bottom wall, the at least one spray tube having nozzles emitting spray into the depending portion.

DETAILED DESCRIPTION

Figure 1:
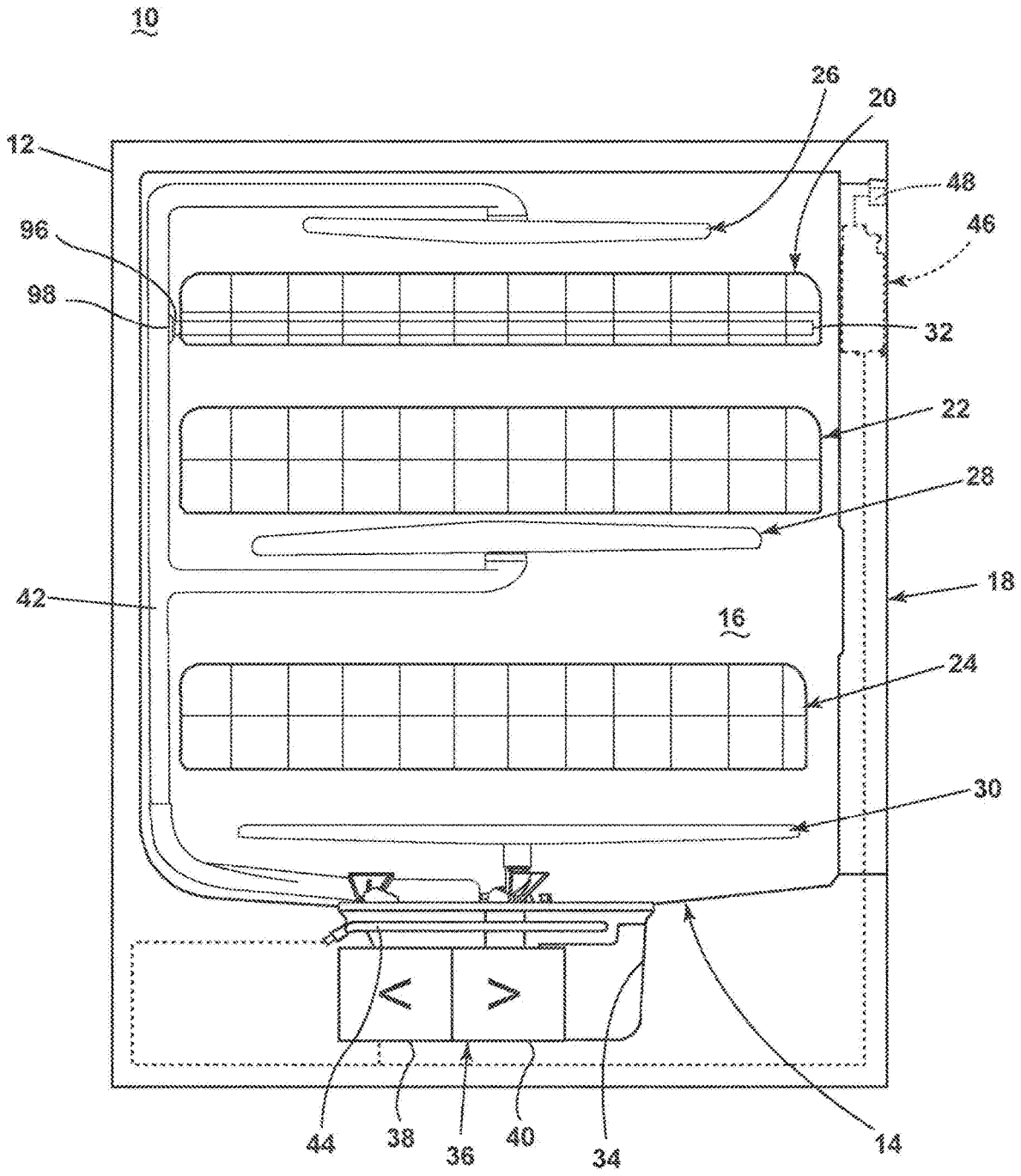
FIG. 1 is a schematic, cross-sectional view of a dishwasher with a low profile rack according to an aspect of the present disclosure.

FIG. 1 illustrates a schematic, cross-sectional view of an exemplary automated dishwasher 10 according to an aspect of the present disclosure. The dishwasher 10 shares many features of a conventional automated dishwasher, which will not be described in detail herein except as necessary for a complete understanding of the present disclosure. While the present disclosure is described in terms of a conventional dishwashing unit, it can also be implemented in other types of dishwashing units, such as in-sink dishwashers, multi-tub dishwashers, or drawer-type dishwashers. A chassis 12 can define an interior of the dishwasher 10 and can include a frame, with or without panels mounted to the frame. For built-in dishwashers, outer panels are typically not needed. For dishwashers that are not built into existing cabinetry, the chassis 12 can include the panels mounted to the frame to form a cabinet for the dishwasher 10. An open-faced tub 14 can be provided within the interior of and mounted to the chassis 12 and can at least partially define a treating chamber 16 for washing or otherwise treating dishes. The open face of the tub 14 defines an access opening for the treating chamber 16.

A closure element, such as a door assembly 18, can be movably mounted to the dishwasher 10 for movement between opened and closed positions to selectively open and close the treating chamber access opening defined by the open face of the tub 14. Thus, the door assembly 18 provides accessibility to the treating chamber 16 for the loading and unloading of dishes or other washable items. It should be appreciated that the door assembly 18 can be secured to the lower front edge of the chassis 12 or to the lower front edge of the tub 14 via a hinge assembly (not shown) configured to pivot the door assembly 18. When the door assembly 18 is closed, user access to the treating chamber 16 can be prevented, whereas user access to the treating chamber 16 can be permitted when the door assembly 18 is open. Alternatively, the closure element can be slidable relative to the chassis 12, such as in a drawer-type dishwasher, wherein the access opening for the treating chamber 16 is formed by an open-top tub. Other configurations of the closure element relative to the chassis 12 and the tub 14 are also within the scope of the present disclosure.

Dish holders, illustrated in the form of upper, middle, and lower dish racks 20, 22, 24, can be located within the treating chamber 16 and receive dishes for treatment, such as washing. The upper, middle, and lower racks 20, 22, 24 are typically mounted for slidable movement in and out of the treating chamber 16 for ease of loading and unloading. Other dish holders can be provided, such as a silverware basket, separate from or combined with the upper, middle, and lower racks 20, 22, 24. As used in this description, the term "dish(es)" is intended to be generic to any item, single or plural, that may be treated in the dishwasher 10, including, without limitation, dishes, plates, pots, bowls, pans, glassware, and silverware. While the dishwasher 10 is illustrated herein as having three dish racks 20, 22, 24, it will be understood that any suitable number and configuration of dish racks is also within the scope of the present disclosure.

A spray system can be provided for spraying liquid in the treating chamber 16 and may be provided in the form of, for example, an upper spray assembly 26, a middle spray assembly 28, and a lower spray assembly 30. The upper spray assembly 26, the middle spray assembly 28, and the lower spray assembly 30 are located, respectively, above the upper rack assembly 20, beneath the middle rack assembly 22, and beneath the lower rack assembly 24 and are illustrated as rotating spray arms by example but are not limited to such positions and sprayer type. The spray system can further include a rack spray assembly 32 coupled to the upper dish rack 20; the rack spray assembly 32 will be discussed in further detail below. Furthermore, the spray system can include additional and/or alternative spray assemblies. For example, a distribution header or spray manifold can be located at the rear of the tub 14 at any vertical position. An exemplary spray manifold is set forth in detail in U.S. Pat. No. 7,594,513, issued Sep. 29, 2009, and titled "Multiple Wash Zone Dishwasher," which is incorporated herein by reference in its entirety.

A recirculation system can be provided for recirculating liquid from the treating chamber 16 to the spray system. The recirculation system can include a sump 34 and a pump assembly 36. The sump 34 collects the liquid sprayed in the treating chamber 16 and can be formed by a sloped or recess portion of a bottom wall of the tub 14. The pump assembly 36 can include both a drain pump 38 and a recirculation pump 40. The drain pump 38 can draw liquid from the sump 34 and pump the liquid out of the dishwasher 10 to a household drain line (not shown). The recirculation pump 40 can draw liquid from the sump 34, and the liquid can be simultaneously or selectively pumped through a supply conduit or tube 42 to each of the spray assemblies 26, 28, 30, 32 for selective spraying. The liquid supply tube 42 extends along a wall of the tub 14 and fluidly connect the pump assembly 36 to the spray assemblies 26, 28, 30, 32. While not shown, a liquid supply system can include a water supply conduit coupled with a household water supply for supplying water to the treating chamber 16.

While the pump assembly 36 is illustrated herein as having separate drain and recirculation pumps 38, 40, in an alternative aspect, the pump assembly 36 can include a single pump configured to selectively supply wash liquid to either the spray system or the drain line, such as by configuring the pump to rotate in opposite directions, or by providing a suitable valve system.

A heating system including a heater 44 can be located, for example, within the sump 34 for heating the liquid contained in the sump 34. The heater 44 can also heat air contained in the treating chamber 16. Alternatively, a separate heating element (not shown) can be provided for heating the air circulated through the treating chamber 16. A filtering system (not shown) can be fluidly coupled with the recirculation flow path for filtering the recirculated liquid.

A control system including a controller 46 can also be included in the dishwasher 10, which can be operably coupled with various components of the dishwasher 10 to implement a cycle of operation. The controller 46 can be located within the door assembly 18 as illustrated, or it can alternatively be located somewhere within the chassis 12. The controller 46 can also be operably coupled with a control panel or user interface 48 for receiving user-selected inputs and communicating information to the user. The user interface 48 can include operational controls such as dials, lights, switches, and displays enabling a user to input commands, such as a cycle of operation, to the controller 46 and receive information.

Figure 2:
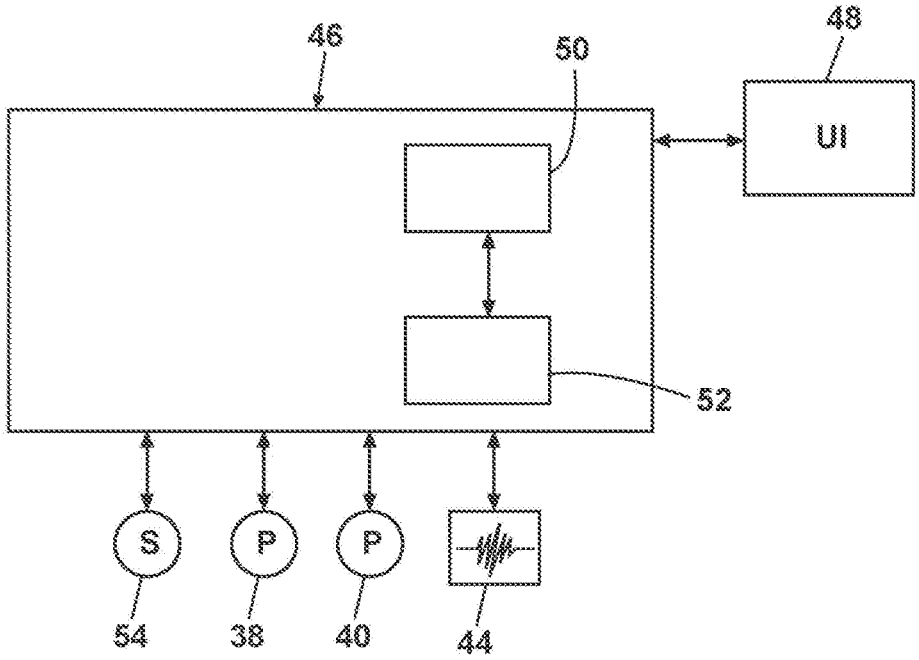
FIG. 2 is a schematic diagram of a control system for the dishwasher of FIG. 1.

As illustrated schematically in FIG. 2, the controller 46 can be coupled with the heater 44 for heating the wash liquid during a cycle of operation, the drain pump 38 for draining liquid from the treating chamber 16, and the recirculation pump 40 for recirculating the wash liquid during the cycle of operation. The controller 46 can be provided with a memory 50 and a central processing unit (CPU) 52. The memory 50 can be used for storing control software that can be executed by the CPU 52 in completing an automatic cycle of operation using the dishwasher 10 and any additional software. For example, the memory 50 can store one or more pre-programmed cycles of operation that can be selected by a user and completed by the dishwasher 10. A cycle of operation for the dishwasher 10 can include one or more of the following steps: a wash step, a rinse step, and a drying step. The wash step can further include a pre-wash step and a main wash step. The rinse step can also include multiple steps such as one or more additional rinsing steps performed in addition to a first rinsing. The amounts of water and/or rinse aid used during each of the multiple rinse steps can be varied. The drying step can have a non-heated drying step (so called "air only"), a heated drying step or a combination thereof. These multiple steps can also be performed by the dishwasher 10 in any desired combination.

The controller 46 can also receive input from one or more sensors 54. Non-limiting examples of sensors that can be communicably coupled with the controller 46 include a temperature sensor and turbidity sensor to determine the soil load associated with a selected grouping of dishes, such as the dishes associated with a particular area of the treating chamber 16.

The dishwasher 10 can include all of the above exemplary systems, a selection of the above exemplary systems, and/or other systems not listed above as desired. Further, some of the systems can be combined with other systems and/or can share components with other systems. Examples of other systems that the dishwasher can further include are a dispensing system that supplies one or more treating agents or chemistries to the treating chamber 16 and an air supply system that can provide air, which can be heated or not heated, to the treating chamber 16, such as for drying and/or cooling the dishes. An exemplary air supply system is set forth in U.S. patent application Ser. No. 12/959,673, filed Dec. 3, 2010 and published as U.S. Patent Application Publication No. 2012/0138106 on Jun. 7, 2012, both of which are incorporated herein by reference in their entireties.

Figure 3:
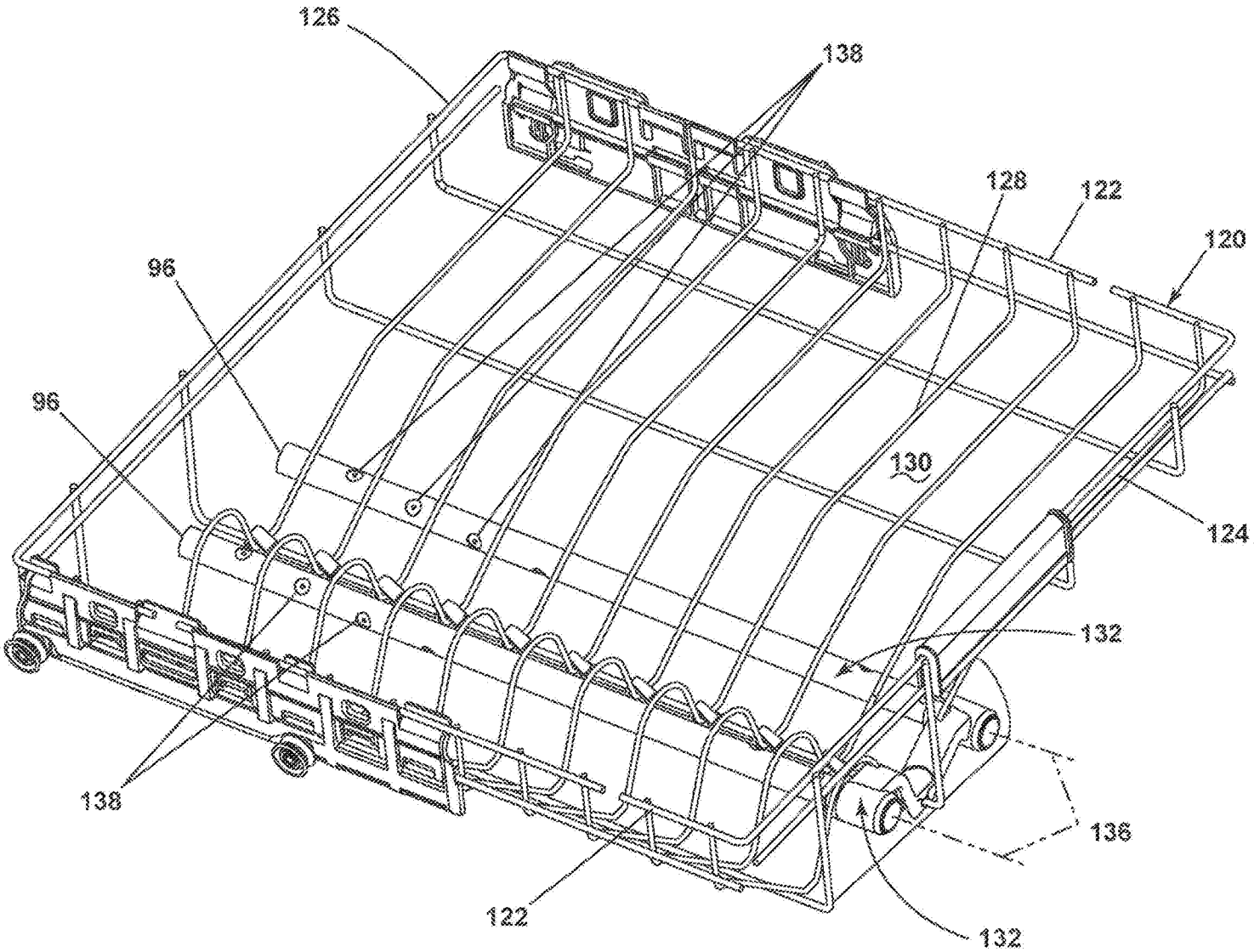
FIG. 3 is a perspective view of the low profile rack of FIG. 1 according to a first aspect of the present disclosure.
Figure 4:
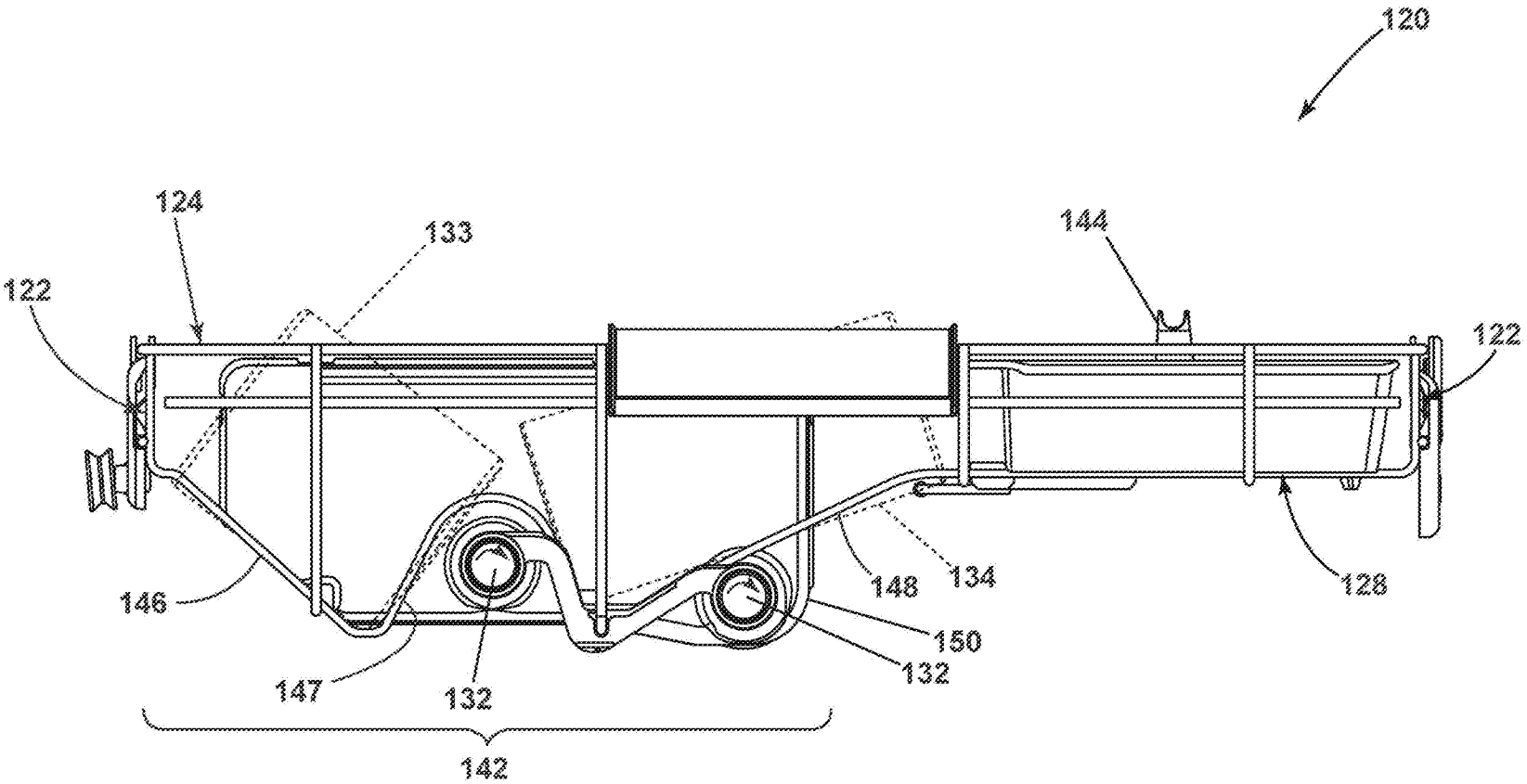
FIG. 4 is a front view of the low profile rack of FIG. 3.

FIG. 3 illustrates a perspective view of an exemplary upper rack assembly 120 with at least one rotatable sprayer 132 according to a first aspect of the present disclosure. The upper rack assembly 120 can be constructed of a wire frame forming opposing side walls 122, front wall 124, rear wall 126, and a bottom wall 128 that together define an open-top holding compartment 130 with the side walls 122, front wall 124, and rear wall 126 extending upwardly from the bottom wall 128. While the bottom wall 128 is illustrated as flat, the bottom wall 128 can have a constant profile or can have a varied profile comprising any combination of inclined, curved, or flat sections or plurality of sections. The varying profile can be utilized to support various dishes as will be described in more detail below. Additionally or alternatively, a plurality of supports such as panels, tines, or other structures, can extend upwardly from the bottom wall 128 and/or the side walls 122, or the front and rear walls 124, 126 to support various dish items, such as, by way of non-limiting example, a short tumbler 133 and a tall tumbler 134 (FIG. 4).

The upper rack assembly 120 can be particularly configured to hold drinking vessels or other low profile items, such as, for example, tall and short tumblers, including old fashioned glasses and highballs, stemware, such as wine glasses, martini glasses, and tulip and saucer champagne glasses, snifters, goblets, bottles, mugs, bowls, containers, and the like, which are hereinafter referred to as "dish items" with it being understand that "dish items" includes those exemplary dishes listed above in addition to others not listed herein. The dish items can be made of any suitable material, including glass, ceramics, plastic, and metals and are not limited to glass materials. In an exemplary aspect, the upper rack assembly 120 can be located near the top of the tub 14 as the uppermost dish rack in the tub 14, which is commonly provided as a low profile rack compared to the other, lower dish racks, because the low profile rack can be sized to hold silverware on its edge. However, it will be understood that the upper rack assembly 120 need not be the uppermost dish rack in the tub 14 and is only heretofore and hereinafter referred to as "upper" for convenience.

The upper rack assembly 120 can be equipped with the at least one rotatable sprayer 132 adapted to provide treating liquid to dish items placed on the upper rack assembly 120. Each of the at least one rotatable sprayers 132 can be selectively rotatable about an axis of rotation 136. The axis of rotation 136 can be parallel to the bottom wall 128. In an exemplary aspect, the rotatable sprayer 132 includes a body in the form of a rod that has a longitudinal axis, which is the longitudinal axis of rotation 136 about which the rotatable sprayer 132 is selectively rotatable. While the sprayers 132 are illustrated herein as being rotatable, it will be understood that the sprayers 132 are not required to be rotatable.

Rotation of the rotatable sprayer 132 can be driven by a single drive mechanism that is coupled directly to the rotatable sprayer 132. It will also be understood that rotations of a plurality of rotatable sprayers 132 can be driven concurrently by a single unified drive mechanism that can control the rotation of multiple rotatable sprayers 132 by the use of, for example, a series of gears that connects the rotatable sprayers 132 and drives them all to rotate in parallel. The mechanism of actuator for driving the rotation of the rotatable sprayers 132, either in series or individually, can be any suitable driving mechanism, non-limiting examples of which include an electric or hydraulic motor selectively operable to directly drive rotation of one or more rotatable sprayers 132 or a gear assembly, which could be provided in the form of a worm gear assembly, spur gears, etc.

The rotatable sprayers 132 can be carried by the upper rack assembly 120 and located below the bottom wall 128 and can be fixedly mounted to the upper rack assembly 120 for movement therewith when the upper rack assembly 120 is slid relative to the tub 14, as illustrated, or the rotatable sprayers 132 can be fixedly mounted to the tub 14 so as to retain its position relative to the tub 14 upon movement of the upper rack assembly 120. In the former case, the rotatable sprayers 132 can dock with the supply tube 42 (FIG. 1) or other structure of the liquid supply and/or recirculation systems when the upper rack assembly 120 is slid to its most rearward position in the tub 14 to establish fluid communication with the liquid supply and/or recirculation systems. By example, the illustrated rotatable sprayers 132 include a connector 96 located at the rear end of the rotatable sprayers 132 and adapted to mate or dock with a receiver 98 in the tub 14. The receiver 98 can be mounted at the rear of the tub 14, such as to the supply tube 42 (FIG. 1), or in any other suitable location.

The rotatable sprayers 132 have been illustrated in the form of a rod or tube sprayer, but it will be understood that the rotatable sprayers 132 can have any suitable cross-sectional shape, such as, by way of non-limiting example, circular, oval, hexagonal, trapezoidal, etc. A plurality of spray nozzles 138 that collectively form an outlet of the rotatable sprayer 132 can also be included along at least a portion of a length of the tube. The spray nozzles 138 can be positioned to spray treating liquid onto the dish items contained within the holding compartment 130 of the upper rack assembly 120. The spray nozzles 138 can be provided along the length of the rotatable sprayer 132 in any suitable configuration, which can be linear or non-linear. By rotating the rotatable sprayer 132, treating liquid can be sprayed in multiple spray angles and trajectories from a single one of the plurality of spray nozzles 138. The nozzles 138 can be provided on the surface of the rotatable sprayer 132, or they can be indented or recessed into the surface of the rotatable sprayer 132. The volume and velocity of the treating liquid emitted from the spray nozzles 138 can be based on the type of dish item contained within the upper rack assembly 120, can be generic for all types of dish items, and/or can be variable from one treating cycle of operation to another and/or within a single treating cycle of operation. Additionally, the spray nozzles 138 can spray liquid alternately (e.g., between rows—one row at a time wherein the rows are sequenced on and off, within rows—sets of nozzles 138 within a row sequenced on and off, where a set refers to any suitable number of nozzles 138, including only one nozzle 138), continuously, and/or intermittently.

FIG. 4 illustrates a front view of the upper rack assembly 120 and the at least one rotatable sprayer 132. The bottom wall 128 of the upper rack assembly 120 can include a depending portion 142 that depends downwardly from the bottom wall 128 and is oriented at an angle relative to the bottom wall 128 to define an incline angle. While the remaining portion of the bottom wall 128, outside of the depending portion 142, is illustrated herein as being substantially horizontal, it will be understood that the bottom wall 128 need not be horizontal or flat, but can have other shapes or profiles. By way of non-limiting example, the bottom wall 128 can accommodate low profile dish items such as utensils, serving spoons, or a silverware basket 144. In an exemplary aspect, the upper rack assembly 120 can be a low profile dish rack assembly, such that the vertical height of the depending portion 142 is greater than the height of the side walls 122 of the upper rack assembly 120. Additionally, the height of the side walls 122 can be selected to be commensurate with a low profile utensil, such as a spoon or a spatula, placed on its side on the bottom wall 128.

In an exemplary aspect, the depending portion 142 comprises two side walls, an outer side wall 146 and an inner side wall 148, as well as a sprayer supporting portion 150 extending downwardly from the inner side wall 148, and a curved support portion 147 provided between the outer and inner side walls 146, 148. The outer and inner side walls 146, 148 can be provided at any angled suitable for supporting items to be washed, such as the short tumbler 133 and tall tumbler 134. While the curved support portion 147 is illustrated herein as having an inverted u-shape, it will be understood that any suitable curved profile is acceptable such that the curved support portion 147 can provide support for items to be washed and can accommodate the rotatable sprayer 132. The angle and relative positions of the outer and inner side walls 146, 148 and the curved support portion 147 can be selected to optimize the angle at which treating liquid is sprayed from the rotatable sprayers 132 into dish items provided on the upper rack assembly 120, and specifically the depending portion 142. Further, at least the depending portion 142, or the depending portion 142 together with the bottom wall 128 can define a nook located vertically below the bottom wall 128 within which the rotatable sprayer 132 can be located. By way of non-limiting example, the nook can be formed by the curved support portion 147, the sprayer supporting portion 150, or the incline angle of the depending portion 142 relative to the bottom wall 128.

Another rotatable sprayer 132 can be accommodated within the sprayer supporting portion 150 such that the wires of the upper rack assembly 120 are provided about the rotatable sprayer 132. In an exemplary aspect, both the rotatable sprayers 132 accommodated within either the curved support portion 147 or the sprayer supporting portion 150 are provided vertically at or above the lowermost point of the depending portion 142 such that the rotatable sprayers 132 are provided within the vertical height of the upper rack assembly 120, rather than exterior to the vertical height of the upper rack assembly 120. More specifically, the rotatable sprayers 132 can be provided within the vertical height of the depending portion 142. By way of non-limiting example, one rotatable sprayer 132 can be provided within the vertical height of the curved support portion while the other rotatable sprayer 132 can be provided within the vertical height of the sprayer supporting portion 150, such that neither of the rotatable sprayers 132 requires additional vertical space beyond the height of the upper rack assembly 120. In an exemplary aspect, the rotatable sprayer 132 provided within the curved support portion 147 can provide treating liquid to dishes placed within the depending portion 142, while the rotatable sprayer 132 provided within the sprayer supporting portion 150 can provide treating liquid to dishes placed on the bottom wall 128.

Figure 5:
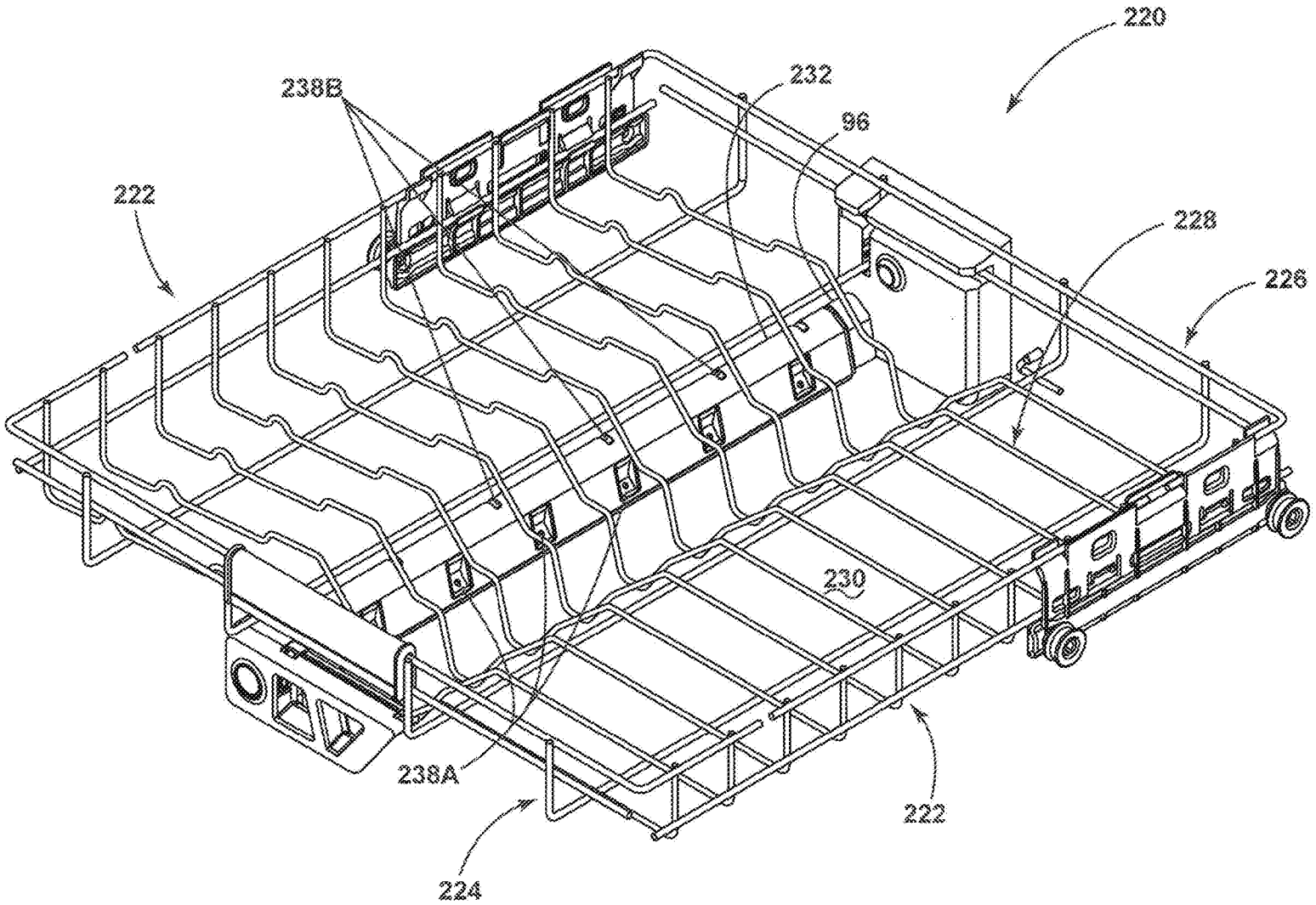
FIG. 5 is a perspective view of the low profile rack of FIG. 1 according to a second aspect of the present disclosure.
Figure 6:
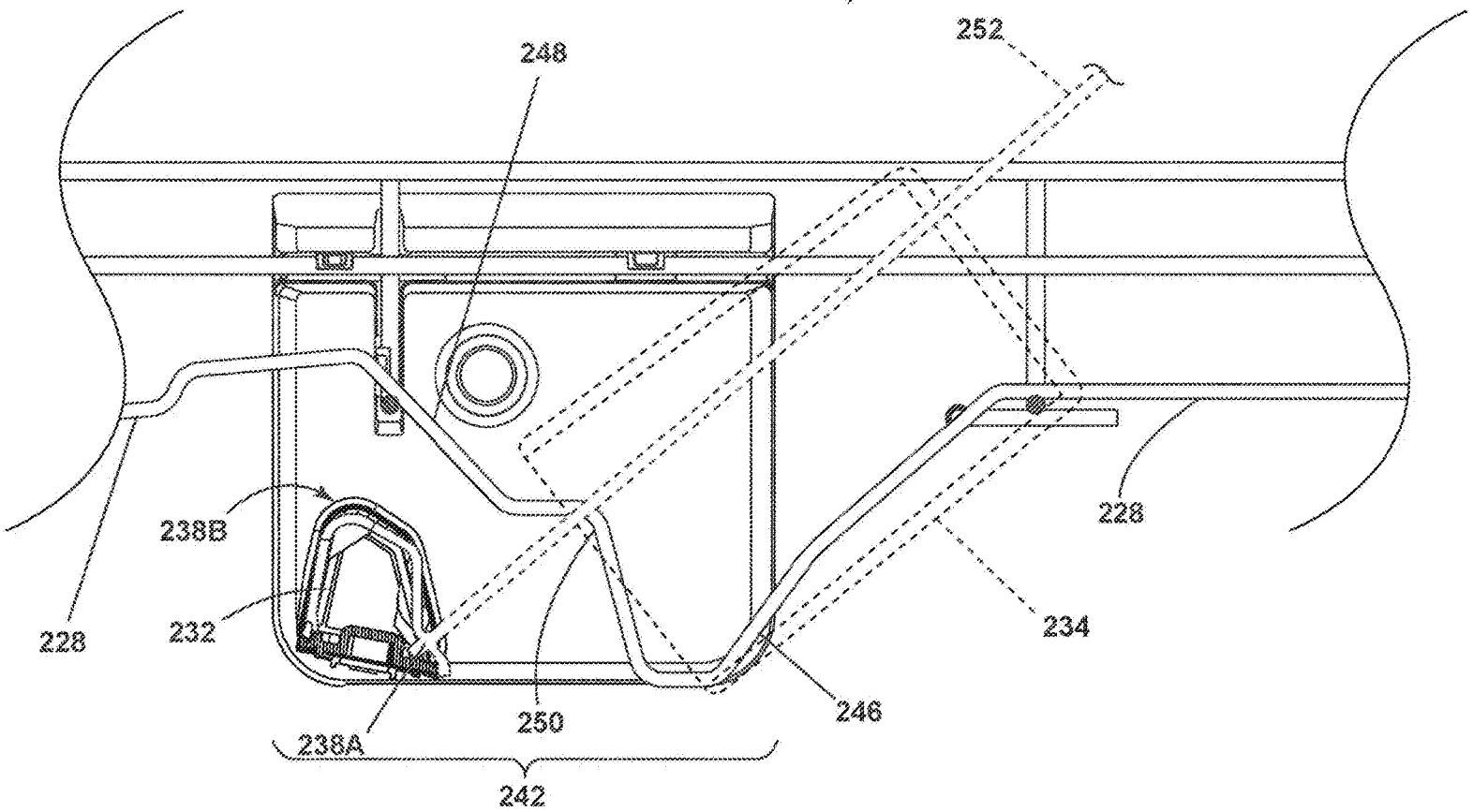
FIG. 6 is a front cross-sectional view of the low profile rack of FIG. 5.

FIG. 5 illustrates a perspective view of an exemplary upper rack assembly 220 and sprayer 232 according to a second aspect of the present disclosure. The upper rack assembly 220 can be constructed of a wire frame forming opposing side walls 222, front wall 224, rear wall 226, and a bottom wall 228 that together define an open-top holding compartment 230. The bottom wall 228 can have a varied configuration comprising any combination of inclined, curved, or flat sections or plurality of sections. The varying profile can be utilized to support various dishes as will be described in more detail below. Additionally or alternatively, a plurality of supports such as panels, tines, or other structures, can extend upwardly from the bottom wall 228 and/or the side walls 222, or the front and rear walls 224, 226 to support various dish items, such as, by way of non-limiting example, a tumbler 234 (FIG. 6).

The upper rack assembly 220 can be particularly configured to hold drinking vessels or other low profile items, such as, for example, tall and short tumblers, including old fashioned glasses, rocks glasses, and highballs, stemware, such as wine glasses, martini glasses, and tulip and saucer champagne glasses, snifters, goblets, bottles, mugs, bowls, containers, and the like, which are hereinafter referred to as "dish items" with it being understand that "dish items" includes those exemplary dishes listed above in addition to others not listed herein. The dish items can be made of any suitable material, including glass, ceramics, plastic, and metals and are not limited to glass materials. While the upper rack assembly 220 can be located near the top of the tub 14, the upper rack assembly 220 need not be the uppermost dish rack in the tub 14 and is only heretofore and hereinafter referred to as "upper" for convenience.

The upper rack assembly 220 can be equipped with the sprayer 232 adapted to provide treating liquid to dish items placed on the upper rack assembly 220. The sprayer 232 can be provided as a static tube, though it will be understood that the sprayer 232 can also be rotatable. The sprayer 232 can be carried by the upper rack assembly 220 and located below the bottom wall 228 and can be fixedly mounted to the upper rack assembly 220 for movement therewith when the upper rack assembly 220 is slid relative to the tub 14, as illustrated, or the sprayer 232 can be fixedly mounted to the tub 14 so as to retain its position relative to the tub 14 upon movement of the upper rack assembly 220. In the former case, the sprayer 232 can dock with the supply tube 42 (FIG. 1) or other structure of the liquid supply and/or recirculation systems when the upper rack assembly 220 is slid to its most rearward position in the tub 14 to establish fluid communication with the liquid supply and/or recirculation systems. By example, the illustrated sprayer 232 includes a connector 96 located at the rear end of the spray tube 90 and adapted to mate or dock with a receiver 98 in the tub 14. The receiver 98 can be mounted at the rear of the tub 14, such as to the supply tube 42 (FIG. 1), or in any other suitable location. While the upper rack assembly 220 is illustrated herein as containing one sprayer 232, it will be understood that any suitable number of sprayers 232 can be provided with the upper rack assembly 220.

The sprayer 232 has been illustrated in the form of a rod or tube sprayer, but it will be understood that the sprayer 232 can have any suitable cross-sectional shape, such as, by way of non-limiting example, circular, oval, hexagonal, trapezoidal, etc., as will be discussed in more detail below. A plurality of spray nozzles 238A, 238B that collectively form an outlet of the sprayer 232 can also be included along at least a portion of a length of the tube. The spray nozzles 238A, 238B can be positioned to spray treating liquid onto the dish items contained within the holding compartment 230 of the upper rack assembly 220. The spray nozzles 238A, 238B can be provided along the length of the sprayer 232 in any suitable configuration, which can be linear or non-linear. The nozzles 238A, 238B can be provided on the surface of the sprayer 232, or they can be indented or recessed into the surface of the sprayer 232. The volume and velocity of the treating liquid emitted from the spray nozzles 238A, 238B can be based on the type of dish item contained within the upper rack assembly 220, can be generic for all types of dish items, and/or can be variable from one treating cycle of operation to another and/or within a single treating cycle of operation. Additionally, the spray nozzles 238A, 238B can spray liquid alternately (e.g., between rows—one row at a time wherein the rows are sequenced on and off, within rows—sets of nozzles 238A, 238B within a row sequenced on and off, where a set refers to any suitable number of nozzles 238A, 238B, including only one nozzle 238A, 238B), continuously, and/or intermittently.

FIG. 6 illustrates a front cross-sectional view of the upper rack assembly 220 and sprayer 232. The bottom wall 228 of the upper rack assembly 220 can include a depending portion 242 that depends downwardly from the bottom wall 228 and is oriented at an angle relative to the bottom wall 228 to define an incline angle. While the remaining portion of the bottom wall 228, outside of the depending portion 242, is illustrated herein as being substantially horizontal, it will be understood that the bottom wall 228 need not be horizontal or flat, but can have other shapes or profiles. By way of non-limiting example, the bottom wall 228 can accommodate low profile dish items such as utensils, serving spoons, or a silverware basket. In an exemplary aspect, the upper rack assembly 220 can be a low profile dish rack assembly, such that the vertical height of the depending portion 242 is greater than the height of the side walls 222 of the upper rack assembly 220. Additionally, the height of the side walls 222 can be selected to be commensurate with a low profile utensil, such as a spoon or a spatula, placed on its side on the bottom wall 228.

Figure 7:
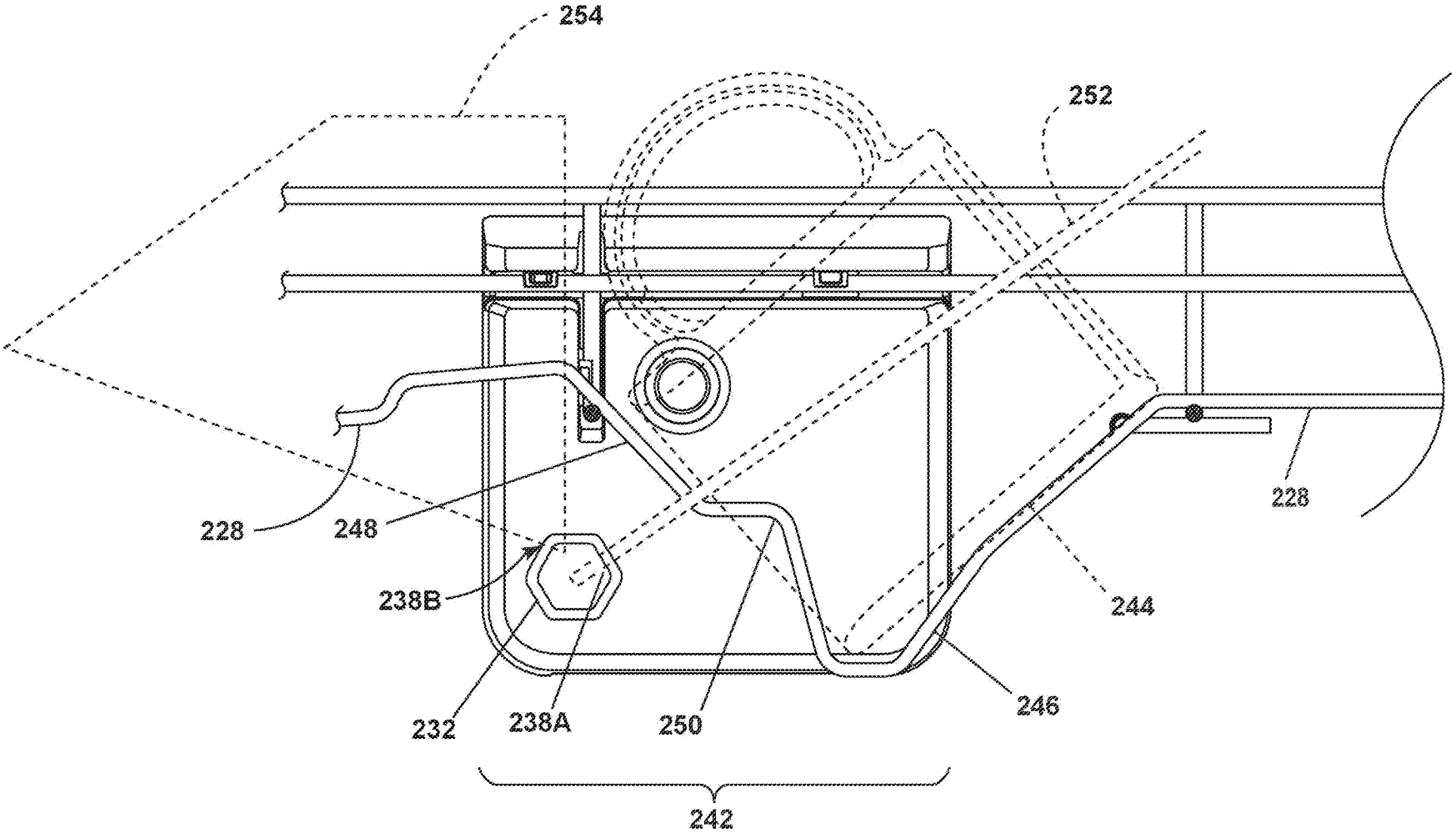
FIG. 7 is a front cross-sectional view of the low profile rack of FIG. 5 according to a third aspect of the present disclosure.

In an exemplary aspect, the depending portion 242 comprises two side walls, an outer side wall 246 and an inner side wall 248. The inner side wall 248 can include a detent 250 for supporting dish items such that the opening of the dish items is oriented toward the sprayer 232. The outer and inner side walls 246, 248 can be provided at any angled suitable for supporting items to be washed, such as the tumbler *234 in FIG. 6, or a mug* 244 *as shown in FIG. 7*. The angle and relative positions of the outer and inner side walls 246, 248 can be selected to optimize the angle at which treating liquid is sprayed from the sprayer 232 into dish items provided on the upper rack assembly 220, and specifically the depending portion 242. The sprayer 232 can be provided vertically at or above the lowermost point of the depending portion 242, such that the sprayer 232 is provided within the vertical height of the upper rack assembly 220, rather than exterior to the vertical height of the upper rack assembly 220. More specifically, the sprayer 232 can be provided within the vertical height of the depending portion 242. Further, at least the depending portion 242, or the depending portion 242 together with the bottom wall 228 can define a nook located vertically below the bottom wall 228 within which the sprayer 232 can be located. By way of non-limiting example, the nook can be formed by the incline angle of the depending portion 242 relative to the bottom wall 228.

In an exemplary aspect, the sprayer 232 can have a non-circular cross-sectional shape as shown in FIG. 6. Such a cross-sectional shape can allow for appropriate distribution of the treating liquid through the nozzles 238A, 238B. By way of non-limiting example, the nozzles 238A can be provided on a portion, or a first face, of the sprayer 232 such that treating liquid exiting the nozzles 238A is sprayed as a jet 252, such as by stream nozzles, into dish items placed on the depending portion 242, though it will be understood that other liquid spray patterns, such as a fan spray, are also contemplated. The nozzles 238B can be provided on a different portion, or a second face at a different orientation from the first face, of the sprayer 232 than the nozzles 238A, such that treating liquid exiting the nozzles 238B is sprayed as a fan 254 (FIG. 7), such as by stand nozzles, towards dish items placed on the bottom wall 228, though it will be understood that other liquid spray patterns are also contemplated. The positions of the nozzles 238A, 238B can be selected to optimize the spraying of treating liquid onto dish items placed on the upper rack assembly 220.

FIG. 7 illustrates a cross-sectional view of an exemplary aspect of the sprayer 232 in which the sprayer 232 has the non-circular cross-sectional shape of a hexagon. As in the aspect of FIG. 6, the nozzles 238A, 238B are provided on at least two different faces of the sprayer 232, the faces provided at different orientations to each other, such that treating liquid exiting the nozzles 238A is sprayed as a jet 252, such as by stream nozzles, toward the depending portion 242, while treating liquid exiting the nozzles 238B is sprayed as a fan 254, such as by stand nozzles, toward the bottom wall 228. Specifically, the placement of the nozzles 238B at a corner of the hexagonal shape allows for fanning of the treating liquid toward the bottom wall 228.

The aspects described herein can be used to provide a low profile rack and wash assembly for a dishwasher for improved use of space and improved washing performance within the dishwasher. While traditional sprayers, such as rotating spray arms, must be provided outside the vertical height of a dish rack and result in the use of additional vertical space for the sprayer that could otherwise be used for dishes, the low profile rack and wash assembly of the present disclosure integrates a rotating or static sprayer tube within the vertical height of the dish rack, so that no additional vertical space is required for the spray assembly beyond the vertical space occupied by the dish rack. Further, by integrating the sprayer within the vertical height of the dish rack, the sprayer and the contours of the dish rack can be strategically placed relative to one another for optimal dishwashing performance. Specifically, for example, the curved support portion holds dish items securely, and also prevents a user from mis-loading the dish rack such that the dish items would be oriented away from the water jets of the sprayer.

It will also be understood that various changes and/or modifications can be made without departing from the spirit of the present disclosure. By way of non-limiting example, although the present disclosure is described for use with a wire dish rack, it will be recognized that the rack height adjustment assembly can be employed with various rack constructions, including molded racks, such as racks molded of plastic.

To the extent not already described, the different features and structures of the various aspects may be used in combination with each other as desired. That one feature may not be illustrated in all of the aspects is not meant to be construed that it cannot be, but is done for brevity of description. Thus, the various features of the different aspects may be mixed and matched as desired to form new aspects, whether or not the new aspects are expressly described. All combinations or permutations of features described herein are covered by this disclosure.

While the present disclosure has been specifically described in connection with certain specific aspects thereof, it is to be understood that this is by way of illustration and not of limitation. Reasonable variation and modification are possible within the scope of the forgoing disclosure and drawings without departing from the spirit of the present disclosure which is defined in the appended claims.

What is claimed is:

1. A dishwasher for treating dishes according to an automatic cycle of operation, the dishwasher comprising:

a tub at least partially defining a treating chamber receiving dishes for treatment;

a spray system providing treating liquid to the treating chamber;

a dish rack located in the tub and having a bottom wall and at least a side wall extending upwardly from the bottom wall, with a depending portion extending downwardly from the bottom wall to define a vertical height of the depending portion, the depending portion oriented at an angle to the bottom wall to define an incline angle; and at least one spray tube carried by the dish rack and located within the vertical height of the depending portion below the bottom wall, the at least one spray tube having nozzles emitting spray into the depending portion;

wherein the dish rack has a low profile with the height of the side wall being less than the vertical height of the depending portion.

2. The dishwasher of claim 1 wherein the at least one spray tube further comprises nozzles emitting at least some spray along the incline angle.

3. The dishwasher of claim 1 wherein the at least one spray tube is rotatable about a longitudinal axis of rotation.

4. The dishwasher of claim 3 wherein the longitudinal axis of rotation is parallel to the bottom wall.

5. The dishwasher of claim 1 wherein the at least one spray tube is static.

6. The dishwasher of claim 1 wherein the at least one spray tube is non-circular in cross-sectional shape.

7. The dishwasher of claim 6 wherein the at least one non-circular spray tube has at least two faces and the nozzles are provided on at least two of the faces.

8. The dishwasher of claim 7 wherein the nozzles on a first of the faces emit spray along the depending portion and the nozzles on a second of the faces emit spray along the bottom wall.

9. The dishwasher of claim 1 further comprising a second spray tube carried by the dish rack, located below the bottom wall, and positioned within the vertical height of the depending portion.

10. The dishwasher of claim 9 wherein the second spray tube comprises nozzles emitting at least some spray along at least the bottom wall.

11. A dishwasher for treating dishes according to an automatic cycle of operation, the dishwasher comprising:

a tub at least partially defining a treating chamber receiving dishes for treatment;

a spray system providing treating liquid to the treating chamber;

a dish rack located in the tub and having a bottom wall and at least a side wall extending upwardly from the bottom wall, with a depending portion extending downwardly from the bottom wall to define a vertical height of the depending portion, the depending portion oriented at an angle to the bottom wall to define an incline angle; and at least one spray tube carried by the dish rack and located within the vertical height of the depending portion below the bottom wall, the at least one spray tube having nozzles emitting spray into the depending portion.

12. The dishwasher of claim 11 wherein the at least one spray tube further comprises nozzles emitting at least some spray along the incline angle.

13. The dishwasher of claim 11 wherein the at least one spray tube is rotatable about a longitudinal axis of rotation.

14. The dishwasher of claim 13 wherein the longitudinal axis of rotation is parallel to the bottom wall.

15. The dishwasher of claim 11 wherein the at least one spray tube is static.

16. The dishwasher of claim 11 wherein the at least one spray tube is non-circular in cross-sectional shape, the at least one non-circular spray tube having at least two faces and the nozzles are provided on at least two of the faces.

17. The dishwasher of claim 16 wherein the nozzles on a first of the faces emit spray along the depending portion and the nozzles on a second of the faces emit spray along the bottom wall.

18. The dishwasher of claim 11 further comprising a second spray tube carried by the dish rack, located below the bottom wall, and positioned within the vertical height of the depending portion.

19. The dishwasher of claim 18 wherein the second spray tube comprises nozzles emitting at least some spray along at least the bottom wall.

20. The dishwasher of claim 11 wherein the depending portion and the bottom wall define a nook located below the bottom wall, and the at least one spray tube is located within the nook.

*21. A dishwasher for treating dishes according to an automatic cycle of operation, the dishwasher comprising:*

*a tub at least partially defining a treating chamber receiving dishes for treatment; and*

*an upper dish rack located in the tub and having a bottom wall and at least one side wall extending upwardly from the bottom wall to define a vertical height of the at least one side wall, with a depending portion extending downwardly from the bottom wall to define a vertical height of the depending portion, the depending portion oriented at an angle to the bottom wall to define an incline angle;*

*wherein the depending portion defines a nook located vertically below the bottom wall within which a sprayer is located;*

*wherein the sprayer has a connector that couples with a receiver of a water supply tube; and*

*wherein the sprayer is coupled to the upper rack for movement therewith when the upper rack is slid relative to the tub.*

*22. The dishwasher of claim 21 wherein the depending portion faces upward to support an article of the incline angle.*

*23. The dishwasher of claim 21 wherein the incline angle is further defined as a first incline angle; and*

*wherein the depending portion is oriented at a second angle to the bottom wall to define a second incline angle.*

*24. The dishwasher of claim 23 wherein the first incline angle opposes the second incline angle.*

*25. The dishwasher of claim 21 wherein the bottom wall is substantially horizontal.*

*26. The dishwasher of claim 21 wherein the bottom wall is oriented laterally offset toward one lateral side of the dish rack.*

*27. The dishwasher of claim 21 wherein the depending portion is oriented laterally offset toward one lateral side of the dish rack.*

*28. The dishwasher of claim 21 wherein the depending portion comprises:*

*a first depending portion side wall, angled to support a first dish item at an orientation such that an opening of the first dish item faces inward relative to the depending portion; and*

*a second depending portion side wall, angled to support a second dish item such that an opening of the first dish item is positioned outward relative to the depending portion.*

*29. The dishwasher of claim 28, wherein the first depending portion side wall and the second depending portion side wall are oriented so that the opening of the first dish item at least partially faces the opening of the second dish item.*

*30. The dishwasher of claim 21 wherein the depending portion comprises at least one depending portion side wall.*

*31. The dishwasher of claim 21 wherein the depending portion comprises two depending portion side walls.*

*32. The dishwasher of claim 21 wherein the depending portion comprises a depending portion outer side wall.*

*33. The dishwasher of claim 21 wherein the depending portion comprises a depending portion inner side wall.*

*34. The dishwasher of claim 33 wherein the depending portion inner side wall comprises a detent to support a dish item such that an opening of the dish item is oriented toward the detent.*

*35. The dishwasher of claim 33 wherein the depending portion further comprises a supporting portion extending downwardly from the depending portion inner side wall.*

*36. The dishwasher of claim 32 wherein the depending portion further comprises:*

*a depending portion inner side wall; and*

*a curved support portion provided between the depending portion outer side wall and the depending portion inner side wall.*

*37. The dishwasher of claim 36 wherein the depending portion inner side wall is angled relative to the bottom wall.*

*38. The dishwasher of claim 37 wherein the depending portion outer side wall is angled relative to the bottom wall.*

*39. The dishwasher of claim 36 wherein the curved support portion has an inverted u-shape.*

*40. The dishwasher of claim 21 wherein the height of the side wall is sized to retain a low profile utensil, a spoon, or a spatula, placed on its side on the bottom wall.*

*41. The dishwasher of claim 21 wherein a remaining portion of the bottom wall outside of the depending portion is substantially horizontal.*

*42. The dishwasher of claim 21 wherein the bottom wall is sized to receive utensils, serving spoons, or a silverware basket.*

*43. The dishwasher of claim 21 further comprising a plurality of supports extending upwardly from the dish rack to support dish items.*

*44. The dishwasher of claim 43 wherein the plurality of supports is sized to support a short tumbler or a tall tumbler.*

*45. The dishwasher of claim 21 wherein the sprayer comprises a tube that extends the length of the nook.*

*46. The dishwasher of claim 43 wherein the plurality of supports is sized to support old fashioned glasses, highballs, stemware, wine glasses, martini glasses, tulip and saucer champagne glasses, snifters, goblets, bottles, mugs, bowls, or containers.*

*47. A dishwasher for treating dishes according to an automatic cycle of operation, the dishwasher comprising:*

*a tub at least partially defining a treating chamber receiving dishes for treatment; and*

*an upper dish rack located in the tub and having a bottom wall and at least a side wall extending upwardly from the bottom wall, with a depending portion extending downwardly from the bottom wall to define a vertical height of the depending portion, the depending portion oriented at an angle to the bottom wall to define an incline angle;*

*wherein the upper dish rack has a low profile with the height of the side wall being less than the vertical height of the depending portion; and*

*wherein the depending portion defines a nook located vertically below the bottom wall within which a sprayer is located;*

*wherein the sprayer has a connector that couples with a receiver of a water supply tube; and*

*wherein the sprayer is coupled to the upper rack for movement therewith when the upper rack is slid relative to the tub.*

*48. A dishwasher for treating dishes according to an automatic cycle of operation, the dishwasher comprising:*

*a tub at least partially defining a treating chamber receiving dishes for treatment;*

*an upper dish rack located in the tub and having a bottom wall on a first side of the upper dish rack and at least one side wall extending upwardly from the bottom wall to define a vertical height of the at least one side wall;*

*a depending portion on a second side wall of the upper dish rack, wherein a bottom of the depending portion is vertically below the bottom wall such that a vertical height of the depending portion is greater than the height of the at least one side wall; and*

*a sprayer coupled to the depending portion, wherein the sprayer has a connector that couples with a receiver of a water supply tube, and wherein the sprayer moves with the depending portion when the depending portion is slid relative to the tub.*

*49. The dishwasher of claim 48 wherein the bottom wall and the depending portion are part of a unitary upper dish rack.*

*50. The dishwasher of claim 48 wherein the sprayer is a tube that extends along the depending portion from a back of the depending portion to a front of the depending portion, the sprayer including multiple nozzles along a length of the water supply tube.*

* * * * *